US010127121B2

(12) United States Patent
Adeeb et al.

(10) Patent No.: US 10,127,121 B2
(45) Date of Patent: Nov. 13, 2018

(54) OPERATION OF A MULTI-SLICE PROCESSOR IMPLEMENTING ADAPTIVE FAILURE STATE CAPTURE

(71) Applicant: International Business Machines Corporation, Armonk, NY (US)

(72) Inventors: Khandker N. Adeeb, Austin, TX (US); Steven J. Battle, Austin, TX (US); Brandon R. Goddard, Friendswood, TX (US); Dung Q. Nguyen, Austin, TX (US); Tu-An T. Nguyen, Austin, TX (US); Nicholas R. Orzol, Austin, TX (US); Brian D. Victor, Austin, TX (US); Brendan M. Wong, Beaumont, TX (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 15/172,248

(22) Filed: Jun. 3, 2016

(65) Prior Publication Data

US 2017/0351583 A1  Dec. 7, 2017

(51) Int. Cl.
*G06F 11/00* (2006.01)
*G06F 11/14* (2006.01)

(52) U.S. Cl.
CPC .... *G06F 11/1471* (2013.01); *G06F 2201/805* (2013.01); *G06F 2201/85* (2013.01); *H05K 999/99* (2013.01)

(58) Field of Classification Search
CPC ............ G06F 11/0772; G06F 11/0778; G06F 11/1402; G06F 11/1471; G06F 11/3024; G06F 11/3055
See application file for complete search history.

(56) References Cited

U.S. PATENT DOCUMENTS 5,966,530 A * 10/1999 Shen ..................... G06F 9/3004
                                                                  712/244
6,857,083 B2 * 2/2005 Floyd .................... G06F 11/261
                                                                  712/227
(Continued)

FOREIGN PATENT DOCUMENTS

EP     2348415 A2    7/2011
EP     2681658 A2    1/2014

OTHER PUBLICATIONS

Maniatakos et al., "Revisiting Vulnerability Analysis in Modern Microprocessors", IEEE Transaction on Computers, date of publication: Nov. 26, 2014, 11 pages, vol. 64, Issue 9, IEEE Xplore Digital Library (online), ISSN: 0018-9340, DOI: 10.1109/TC.2014. 2375232.

*Primary Examiner* — Elmira Mehrmanesh
(74) *Attorney, Agent, or Firm* — Joseph D. Downing; Nathan Rau; Kennedy Lenart Spraggins LLP (57) ABSTRACT

Operation of a multi-slice processor that includes a plurality of execution slices and a plurality of load/store slices, where the load/store slices are coupled to the execution slices via a results bus. Operation of such a multi-slice processor includes: capturing first state information corresponding to a first set of control signals; monitoring state information of a plurality of logical components of the multi-slice processor; selecting, in dependence upon one or more selection criteria and upon the monitored state information, a second set of control signals; and capturing second state information corresponding to the second set of control signals, wherein the first set of control signals is different than the second set of control signals.

19 Claims, 6 Drawing Sheets

(56) References Cited

U.S. PATENT DOCUMENTS

| | | | |
|---|---|---|---|
| 7,120,685 B2* | 10/2006 | Ullmann | G06F 11/0709 709/224 |
| 7,203,881 B1 | 4/2007 | Williams et al. | |
| 7,269,713 B2* | 9/2007 | Anderson | G06F 9/3836 712/214 |
| 7,664,936 B2* | 2/2010 | Jensen | G06F 9/30087 712/214 |
| 7,979,750 B2* | 7/2011 | Al-Omari | G06F 11/348 714/45 |
| 8,041,936 B2* | 10/2011 | Orita | G06F 11/1417 713/1 |
| 8,443,227 B2 | 5/2013 | Carlough et al. | |
| 8,468,397 B2* | 6/2013 | Yamazaki | G06F 11/2215 714/705 |
| 8,522,087 B2* | 8/2013 | Koudele | G04F 10/005 341/118 |
| 8,682,705 B2* | 3/2014 | Bobak | G06Q 10/06 705/7.12 |
| 8,826,079 B2 | 9/2014 | Gilday et al. | |
| 9,037,911 B2* | 5/2015 | Rentschler | G06F 11/22 714/34 |
| 9,043,654 B2 | 5/2015 | Duron et al. | |
| 2004/0153838 A1* | 8/2004 | Swanson | G01R 31/318522 714/39 |
| 2008/0178048 A1* | 7/2008 | Balazich | G06F 11/0724 714/48 |
| 2010/0070447 A1* | 3/2010 | Pfuntner | G06F 11/3006 706/47 |
| 2012/0221884 A1* | 8/2012 | Carter | G06F 11/0772 714/2 |
| 2013/0247008 A1* | 9/2013 | Mitran | G06F 9/30058 717/130 |
| 2014/0237454 A1* | 8/2014 | Delporte | G06F 11/3636 717/128 |
| 2015/0082098 A1* | 3/2015 | Anand | G06F 11/3055 714/47.1 |
| 2015/0324272 A1 | 11/2015 | Seibert, Jr. et al. | |

* cited by examiner

OPERATION OF A MULTI-SLICE PROCESSOR IMPLEMENTING ADAPTIVE FAILURE STATE CAPTURE

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a plurality of load/store slices, where the load/store slices are coupled to the execution slices via a results bus. Operation of such a multi-slice processor includes: capturing first state information corresponding to a first set of control signals; monitoring state information of a plurality of logical components of the multi-slice processor; selecting, in dependence upon one or more selection criteria and upon the monitored state information, a second set of control signals; and capturing second state information corresponding to the second set of control signals, wherein the first set of control signals is different than the second set of control signals.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
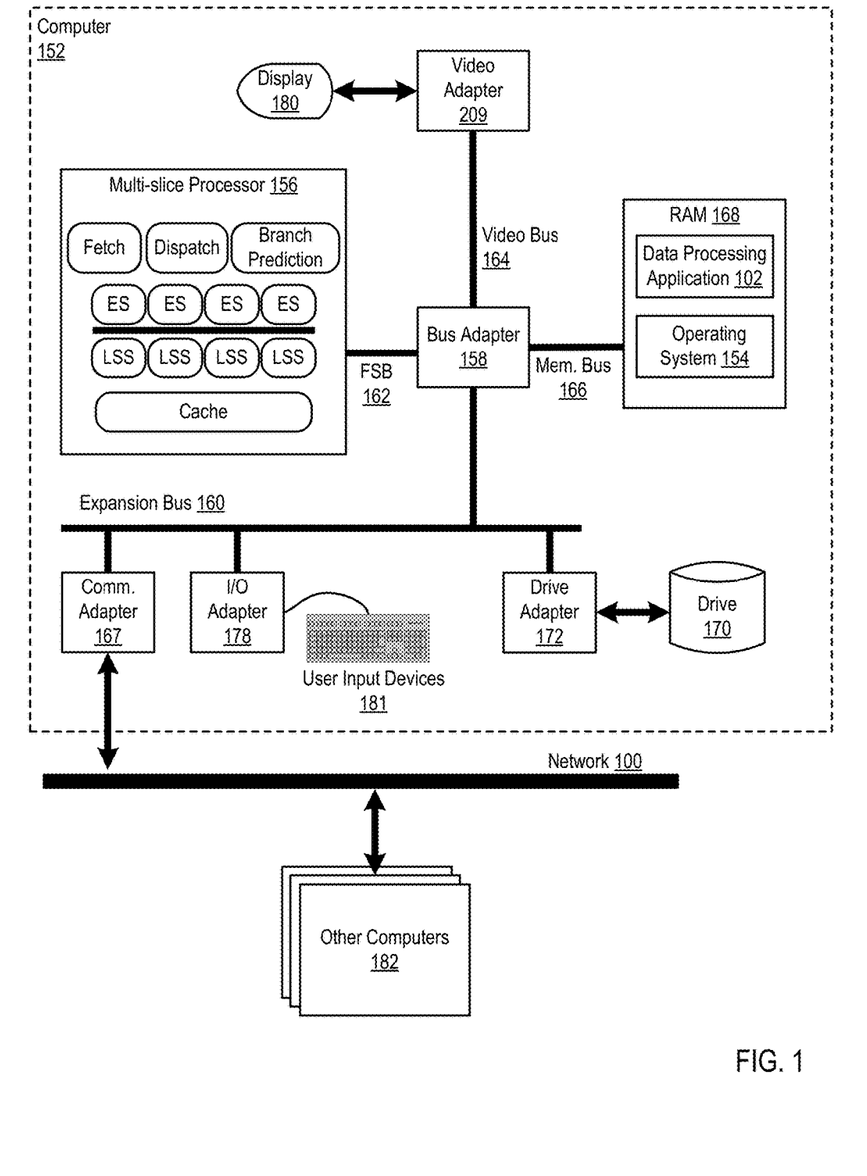
FIG. 1 sets forth a block diagram of an example system configured for operation of a multi-slice processor according to different embodiments.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
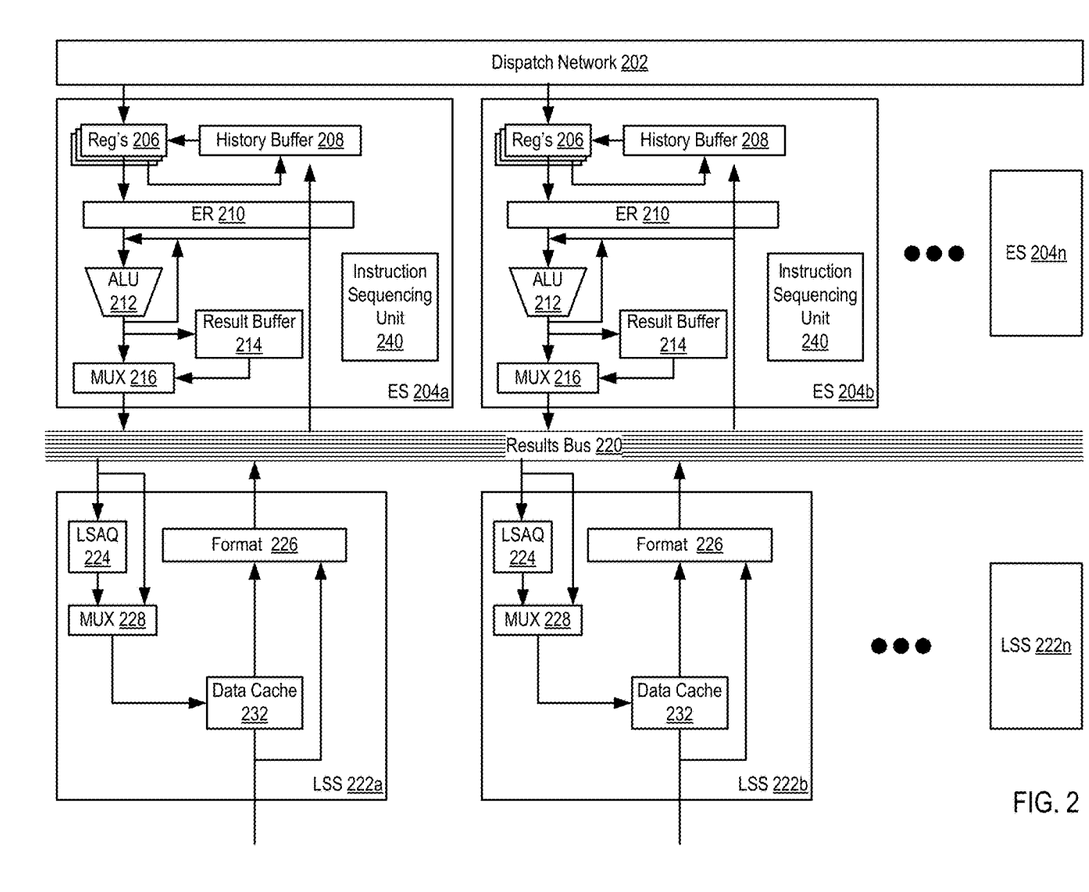
FIG. 2 sets forth a block diagram of a portion of a multi-slice processor according to different embodiments.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same logical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The issue queue may also include a single entry per single instruction, where the single entry handles all operands for the single instruction. The execution reservation station may issue a complete instruction at a time, including the operands for the instruction when the operands for the instruction are ready, for execution—depending on whether the instruction is a load/store instruction or an arithmetic instruction—by the arithmetic logic unit (ALU) (212) or to a load/store slice (222a, 222b, 222c) via the results bus (220). For example, the execution reservation station may determine that data for all operands is available, and in response, the execution reservation station may issue the instruction to the arithmetic logic unit (212).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then be issued to any other slice for performance benefits. Further, an instruction may also be executed by a different execution slice than the execution slice from which the instruction is issued. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a load/store access queue (LSAQ) (224), a multiplexer (MUX) (228), a data cache (232), and formatting logic (226), among other components described below with regard to FIG. 3. The load/store access queue (224) receives load and store operations to be carried out by the load/store slice (222). The formatting logic (226) formats data into a form that may be returned on the results bus (220) to an execution slice as a result of a load or store instruction. The multiplexer (228) may select an input in dependence upon data from the load/store access queue (224) or on receiving data from the results bus.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including branch mispredictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5. In other words, in this example, instruction B is moved back into the entry of the general purpose register for logical register 5 instead of instruction A because instruction B was not flushed. However, in this example, if instruction C and instruction B been flushed, then instruction A would have been selected to be moved back to the history buffer.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one or more logical registers as its source, may also target another one or more logical registers for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted within individual execution slices, in some cases, the instruction sequencing unit may be implemented independently of the execution slices or implemented within dispatch network (202). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions, where a program order may be determined by an instruction tag (ITAG). Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
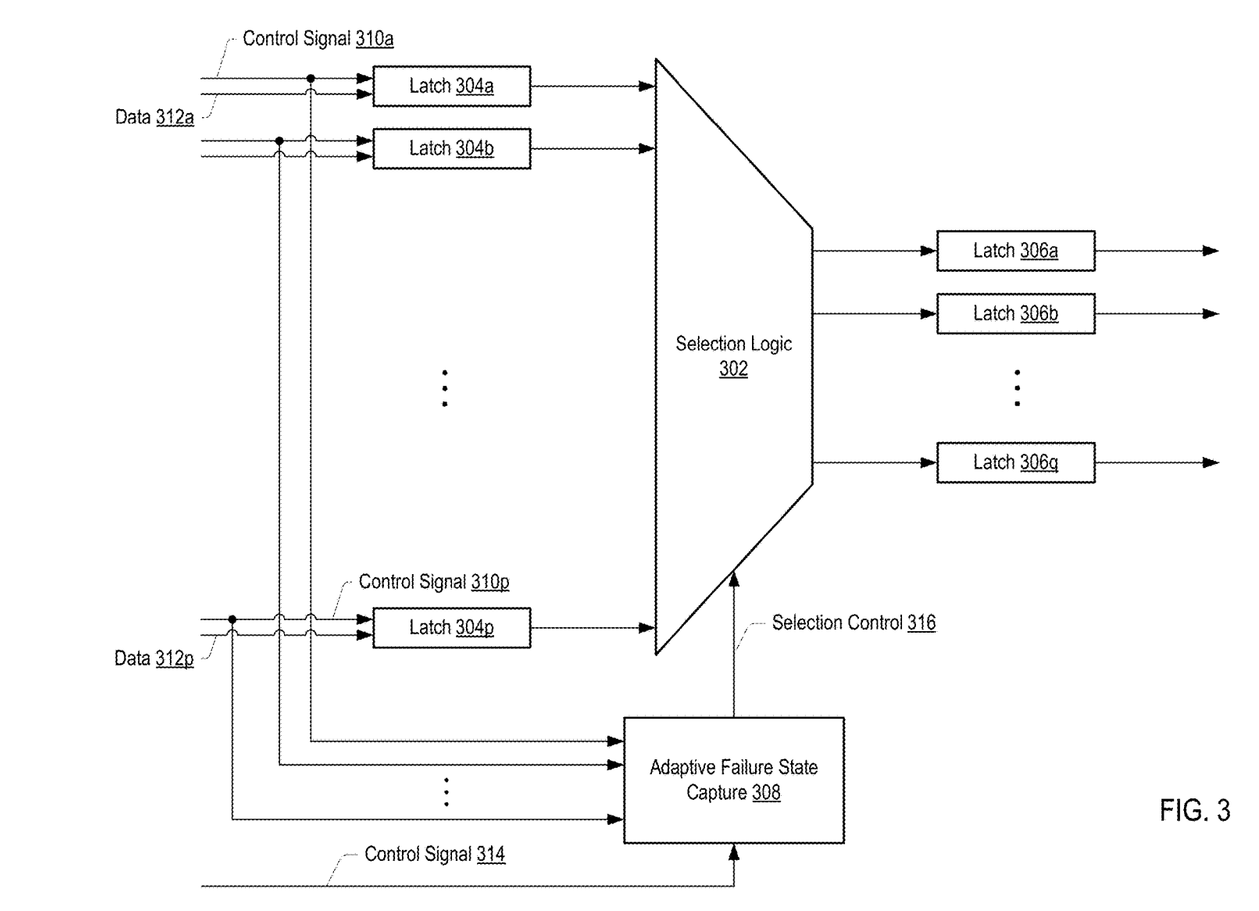
FIG. 3 sets forth a block diagram of adaptive failure state capture logic according to different embodiments.

For further explanation, FIG. 3 sets forth a logic diagram configured to implement adaptive failure state capture within a multi-slice processor. Adaptive failure state capture may allow for dynamic selection of state information to capture, or store, within a bank of observation latches—where the captured state information may be available for debugging access.

In one example, the adaptive failure state information logic may select state information to capture in response to—or triggered by—information provided on control signal lines that indicate current status information for a multi-slice processor component that may be likely to encounter an error condition. In this way, the adaptive failure state logic may use the control signal information to select state information to provide to the observation latches that correspond with components of the multi-slice processor that are likely to encounter an error.

In another example, the adaptive failure state information logic may select state information to capture within observation latches in response to configurable priority information that may be specified by a user, or may be default priority information. For example, a user may specify priority information that indicates that state information corresponding to a particular component is to be selected under all circumstances, or under a particular set of conditions. In other words, if a user is interesting in capturing information from a particular component of the multi-slice processor, the user may define priority information usable by the adaptive failure state capture logic to select state information received from the particular component to provide to be captured by the observation latches.

In this way, the adaptive failure state information logic may be configured to determine state information to capture based on control signal information, configured to determine state information to capture based on configurable priority information, or configured to determine state information to capture based on a combination of control signal information and configurable priority information.

Generally, more state information may be available that may be provided to a debug system through the available bank of observation latches. Therefore, to prevent loss of relevant state information, the adaptive failure state capture (308) logic may be configured to capture state information determined to be most useful. In some cases, the adaptive failure state capture (308) logic captures state information in dependence upon user-specified error type priority information, in dependence upon a predicted error, or in dependence upon a combination of user-specified error type priority information and a predicated error or errors.

The adaptive failure state capture logic diagram includes adaptive failure state capture (308) logic, selection logic (302), state information latches (304a-304p), and observation latches (306a-306q).

The adaptive failure state capture (308) logic may be configured to receive and store data from control signals (310a-310p), where the control signals (310a-310p) also provide signal information to state information latches (304a-304p). The control signals (310a-310p), when carrying control signal information, may serve as triggers for the adaptive failure state capture (308) logic, where the triggering information, or control signal information, may be used to identify a pattern of activity and state information for a particular component to serve as a basis for selecting one or more particular state information latches to provide state information to one or more observation latches. For example, an instruction sequencing unit may provide control signal information indicative of a processing situation corresponding with a likelihood of a particular type of error condition. In this example, the adaptive failure state capture (308) logic may take the control signal input and select one or more state information latches—which correspond with the determined particular type of error condition—to provide state information to one or more observation latches.

In this way, for any particular trigger or control signal information, where particular control signal information corresponds with a particular error condition, the adaptive failure state capture (308) logic may determine a set of state information latches to select for providing input to a set of observation latches.

The adaptive failure state capture (308) logic may use, or trigger from, this control signal information, in addition to using additional control signal information from control signal (314), to determine, or predict, a set of control signals—where control signals correspond to latched state information in latches (304a-304p)—for which to capture state information to provide to the observation latches (306a-306q). Generally, as noted above, there are more state information latches than there are observation latches. In other words, in general, for the p state information latches, and the q observation latches, p is greater than q.

The selection logic (302) may receive a selection control signal (316) from the adaptive failure state capture (308) logic, where the selection control signal (316) may specify which of the state information latches (304a-304p) to select to provide data to the observation latches (306a-306q).

The state information latches (304a-304p) may receive and store control signal information received along, respectively, control signal lines (310a-310p), and may receive and store state information received along, respectively, data lines (312a-312p). For example, a particular latch among the state information latches may receive state information from any particular component of the multi-slice processor, for example, the history buffer, the instruction sequencing unit, or any a load/store slice logical component or any execution slice logical component.

The observation latches (306a-306q) may receive and store state information received from the selection logic (302), where the state information may be read from, or provided to, a debugging component or system. In some cases, the debugging component or system may be external to the multi-slice processor.

Figure 4:
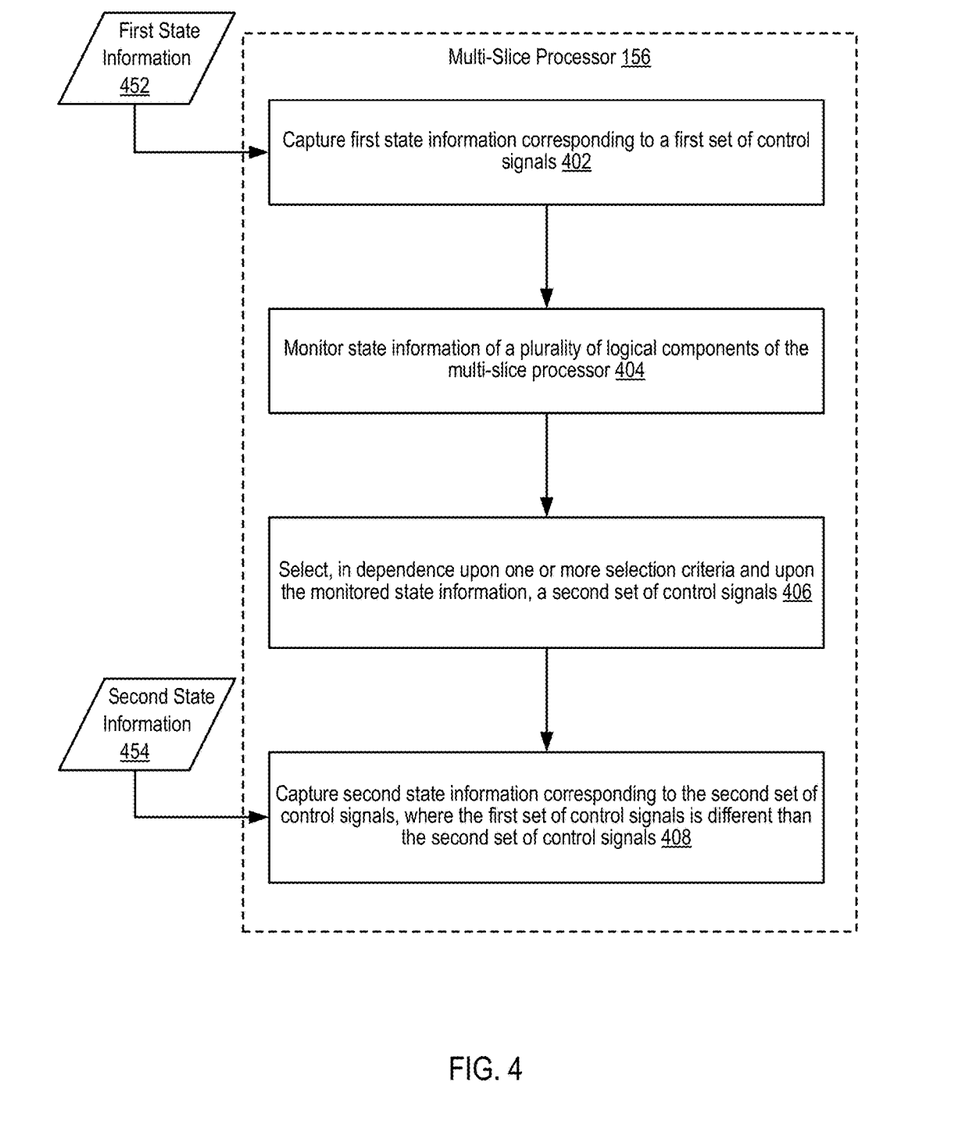
FIG. 4 sets forth a flow chart illustrating an exemplary method of operation of a multi-slice processor configured to implement adaptive failure state capture according to different embodiments.

For further explanation, FIG. 4 sets forth a flow chart illustrating an exemplary method of adaptive failure state capture. The method of FIG. 4 may be carried out by a multi-slice processor similar to that in the examples of FIGS. 1-3.

The method of FIG. 4 includes capturing (402) first state information (452) corresponding to a first set of control signals. Capturing (402) the first state information (452) corresponding to a first set of control signals may be carried out by adaptive failure state capture (308) logic providing selection information along selection control (316) line to selection logic (302), where the selection control (316) line identifies which of the state information latches (304a-304p) to select to provide state information to observation latches (306a-306q).

Capturing (402) the first state information (452) corresponding to a first set of control signals may be further carried out by the adaptive failure state capture (308) logic determining which subset of control signals providing information, such as control signals (310a-310p), to use to select the subset of state information latches from among state information latches (304a-304p) to provide state information to one or more observation latches of the observation latches (306a-306q). As noted above, the state information to capture may be dependent upon a pattern of control signal information, upon configurable priority information, or upon a combination of a pattern of control signal information and configurable priority information. In this way, the adaptive failure state capture (308) logic may select a set of control signals, corresponding to state information from one or more components, to capture state information from the one or more components.

The adaptive failure state capture (308) logic may receive control signal information along one or more of control signal lines (310a-310p), where the one or more control signal lines of the control signal lines (310a-310p) provide information received from one or more components of the multi-slice processor, and where the one or more control signal lines of the control signal lines (310a-310p) include state information generated from currently executing logical components of the multi-slice processor.

Further, the state information received may specify a current status, which may or may not be an error status. For example, the state information may indicate particular state information for a particular component of the multi-slice processor, where the particular state information indicates current status for one or more aspects of the execution of the particular component. As one example, in the case where the particular component is an instruction sequencing unit, the status information may indicate instructions in an issue queue, a number of times an instruction has been retried, or any other type of information corresponding to the execution of the instruction sequencing unit. Similarly, for other components, different types of information pertaining to the execution steps of a particular logical component may be provided along the control lines (310a-310p).

In this way, the adaptive failure state capture (308) logic may analyze the state information received, and identify or match patterns of control signal information with likely, or possible, error conditions that correspond to the pattern of control signal information. For example, if a particular component is a load/store slice, and the control signal information includes a number of times that an instruction has been reissued, then the adaptive failure state capture (308) logic may compare the number of times that the instruction has been reissued, and if the number is greater than a threshold number, then the adaptive failure state capture (308) logic may determine that an error condition is likely, or possible, and in response, the adaptive failure state capture (308) logic may include one or more state information latches of the state information latches (304a-304p) that correspond to the load/store slice—where the load/store slice may be one of the multiple load/store slices of the multi-slice processor—and provide selection control (316) information instructing the selection logic (302) to select one or more the state information latches that correspond to the load/store slice for providing state information to one or more observation latches.

Further, the adaptive failure state capture (308) logic may access a stored configuration file with priority information on which signals to prioritize in selecting a set of control signals, corresponding to one or more state information latches, for capturing state information to store in one or more of the observation latches.

The method of FIG. 4 also includes monitoring (404) state information of a plurality of logical components of the multi-slice processor. Monitoring (404) state information of the plurality of logical components may be carried out by the adaptive failure state capture (308) logic receiving state information from various logical components of the multi-slice processor along control signal (314) line, along one or more of the control signal (310a-310p) lines, or along both the control signal (314) line and one or more of the control signal (310a-310p) lines. In this way, the adaptive failure state capture (308) may trigger off of received control information to analyze the control signal information and potentially update which state information latches to capture and provide to the observation latches.

The method of FIG. 4 also includes selecting (406), in dependence upon one or more selection criteria and upon the monitored state information, a second set of control signals. Selecting (406) the second set of control signals may be carried out by the adaptive failure state capture (308) logic accessing selection criteria, where the selection criteria may correspond patterns of state information received from different logical components with a corresponding priority value, or weighted value, used to select state information latches that correspond with particular control signals.

Selecting (406) the second set of control signals may also be carried out by the adaptive failure state capture (308) logic accessing selection criteria that specifies weights, or priorities, for state information to capture, where the weights or priority information may be used to determine which of the state information latches to select for providing state information to the observation latches. Similarly, the accessed selection criteria may specify that one or more state information latches are to be included regardless. For example, the selection criteria may interpret a weight value to mean that a specified state information latch, corresponding to a particular logical component, is to always be included in a selected set of state information latches to capture for providing to observation latches.

Selecting (406) the second set of control signals may also be carried out by the adaptive failure state capture (308) logic using triggering information, or control signal information, feeding into the state information latches, in addition to control signal information along control signal (314) line, and using the control signal information to determine whether, based at least on a pattern present in the control signal information, an error is possible, or likely for a particular logical component, so that particular state information latches fed from the particular logical component are selected. In other words, in this example, the set of control signals selected correspond to the particular state information latches.

For example, if there are q observation latches, the adaptive failure state capture (308) logic may use the selection criteria and the monitored control signal information to determine that 50% of n state information latches for an instruction sequencing unit are to be selected, 25% of n state information latches for a history buffer are to be selected, and 25% of n state information latches for an arithmetic logic unit are to be selected—where each state information latch corresponds with respective control signals. In other words, a quantity of state information latches to feed in to the observation latches may be selected proportionally to a likelihood of an error occurring within a particular logical component. In different cases, in dependence upon different selection criteria and different control signal information, the adaptive failure state capture (308) logic may select different sets of state information latches for providing captured state information to the observation latches.

The method of FIG. 4 also includes capturing (408) second state information (454) corresponding to the second set of control signals, where the first set of control signals is different than the second set of control signals. Capturing (408) the second state information (454) may be carried out by the adaptive failure state capture (308) logic providing selection control information along selection control (316) line to the selection (302) logic—where the selection control information specifies which of the state information latches, which correspond to the second set of control signals, to select for providing state information to the observation latches.

In this way, the adaptive failure state capture (308) logic may dynamically select which state information to capture to provide to the observation latches—where a dynamic selection may be based on a variety of factors, including potential upcoming errors based on control signal information, configurable priority information, or a combination of control signal information and configurable priority information.

Figure 5:
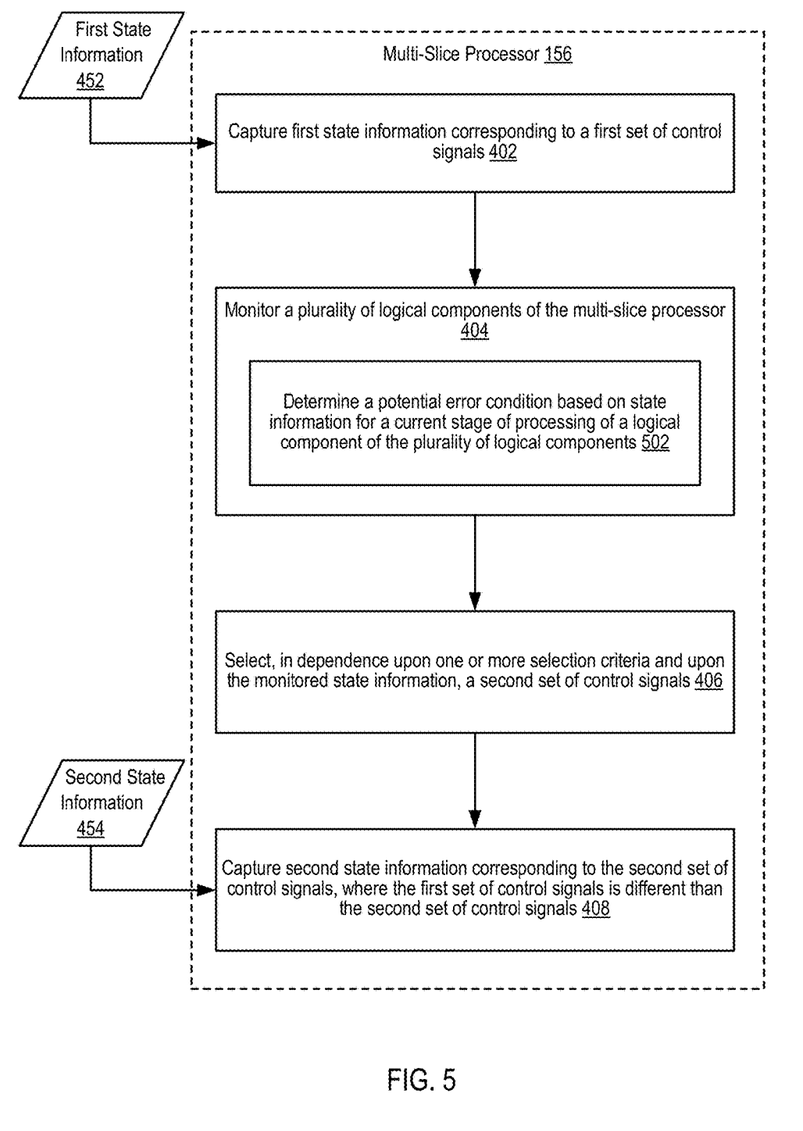
FIG. 5 sets forth a flow chart illustrating an exemplary method of operation of a multi-slice processor configured to implement adaptive failure state capture according to different embodiments.

For further explanation, FIG. 5 sets forth a flow chart illustrating an exemplary method of adaptive failure state capture. The method of FIG. 5 may be carried out by a multi-slice processor similar to that in the examples of FIGS. 1-3.

The method of FIG. 5 is similar to the method of FIG. 4 in that the method of FIG. 5 also includes: capturing (402) first state information (452) corresponding to a first set of control signals; monitoring (404) state information of a plurality of logical components of the multi-slice processor; selecting (406), in dependence upon one or more selection criteria and upon the monitored state information, a second set of control signals; and capturing (408) second state information (454) corresponding to the second set of control signals, where the first set of control signals is different than the second set of control signals.

The method of FIG. 5 differs from the method of FIG. 4, however, in that the method of FIG. 5 further specifies that monitoring (404) a plurality of logical components of the multi-slice processor includes determining (502) a potential error condition based on state information for a current stage of processing of a logical component of the plurality of logical components (502), and further specifies that selecting (406), in dependence upon one or more selection criteria and upon monitoring the plurality of logical components, a second set of control signals includes determining (504), in dependence upon the potential error condition, a control signal corresponding to the logical component determined to have the potential error condition. Further, a determined control signal may correspond with a particular state information latch that receives state information in addition to receiving the control signal information from a particular logical component.

Determining (502) the potential error condition may be carried out by the adaptive failure state capture (308) logic matching a control signal pattern for a current stage of processing of a logical component with an error condition within the logical component. For example, for a particular component, a state information indicating a number of attempts, or state information indicating a particular combination of elements, or state information indicating a particular result may be matched with potential error conditions for that logical component that may arise based on the state information. Further, a particular set of control signals corresponds to a particular set of state information latches receiving state information from one or more logical components.

In this way, the adaptive failure state capture (308) logic may select state information latches for capturing information within the observation latches that correspond to logical components that may potentially be reaching an error state instead of other state information latches that correspond to logical components that would provide state information that is less useful to a debug system.

Figure 6:
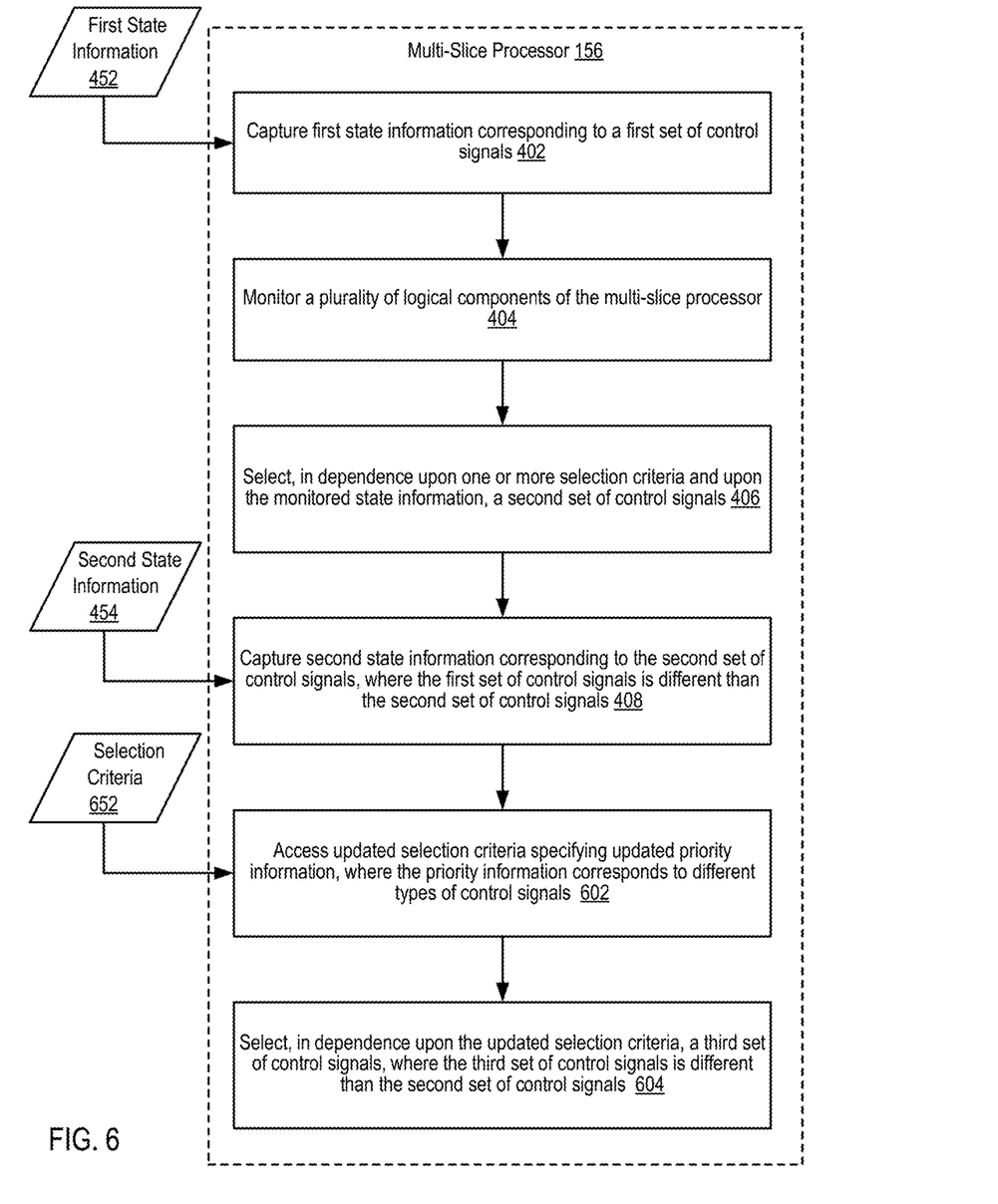
FIG. 6 sets forth a flow chart illustrating an exemplary method of operation of a multi-slice processor configured to implement adaptive failure state capture according to different embodiments.

For further explanation, FIG. 6 sets forth a flow chart illustrating an exemplary method of adaptive failure state capture. The method of FIG. 6 may be carried out by a multi-slice processor similar to that in the examples of FIGS. 1-3.

The method of FIG. 6 is similar to the method of FIG. 4 in that the method of FIG. 6 also includes: capturing (402) first state information (452) corresponding to a first set of control signals; monitoring (404) state information of a plurality of logical components of the multi-slice processor; selecting (406), in dependence upon one or more selection criteria and upon the monitored state information, a second set of control signals; and capturing (408) second state information (454) corresponding to the second set of control signals, where the first set of control signals is different than the second set of control signals.

The method of FIG. 6 differs from the method of FIG. 4, however, in that the method of FIG. 6 further includes: accessing (602) updated selection criteria (652) specifying updated priority information, where the priority information corresponds to different types of control signals; and selecting (604), in dependence upon the updated selection criteria, a third set of control signals, where the third set of control signals is different than the second set of control signals.

Accessing (602) the updated selection criteria (652) may be carried out by the adaptive failure state capture (308) logic receiving an interrupt signal indicating an update to selection criteria, where in response to receiving the interrupt signal, the adaptive failure state capture (308) logic may read a memory location, or access one or more registers, to access the updated selection criteria (652). Alternatively, the adaptive failure state capture (308) logic may periodically read a memory location, or access one or more registers to determine whether an update to the selection criteria has occurred, and if an update has occurred, then the adaptive failure state capture (308) logic may access the updated selection criteria (652).

Selecting (602) the third set of control signals may be carried out by the adaptive failure state capture (308) logic similar to selecting (406) the second set of control signals, where the selecting (602) is based on the updated selection criteria instead of the previous selection criteria.

In this way, the adaptive failure state capture (308) logic may, at different points in time, be dynamically instructed to emphasize particular logical components from which to capture state information for providing to observation latches.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a plurality of execution slices, wherein the method comprises:
    capturing, by adaptive failure state information logic in a bank of observation latches, first state information corresponding to a first set of control signals;
    monitoring, by the adaptive failure state information logic, state information of a plurality of logical components of the multi-slice processor;
    selecting, by the adaptive failure state information logic in dependence upon one or more selection criteria and upon the monitored state information, a second set of control signals, wherein the selection criteria uses the monitored state information to identify a pattern of activity and state information to serve as a basis for selecting one or more particular state information latches to provide state information to one of more observation latches; and capturing second state information, by the adaptive failure state information logic in the bank of observation latches, corresponding to the second set of control signals, wherein the first set of control signals is different than the second set of control signals.

2. The method of claim 1, wherein monitoring the plurality of logical components comprises determining a potential error condition based on the monitored state information for a current stage of processing of a logical component of the logical components.

3. The method of claim 2, wherein the logical component is an instruction sequencing unit, and wherein the state information indicates a program counter value corresponding to a potential hang state.

4. The method of claim 2, wherein the logical component is a history buffer, and wherein the state information indicates multiple attempts at a restore of an instruction.

5. The method of claim 1, wherein the first set of control signals correspond to a first set of state information latches receiving state information from one or more logical components, wherein the second set of control signals correspond to a second set of state information latches receiving state information from one or more logical components, and wherein the first set of state information latches is different than the second set of state information latches.

6. The method of claim 1, wherein the one or more selection criteria includes priority information corresponding to different types of control signals.

7. The method of claim 6, further comprising:
accessing updated selection criteria specifying updated priority information; and
selecting, in dependence upon the updated selection criteria, a third set of control signals, wherein the third set of control signals is different than the second set of control signals.

8. A multi-slice processor comprising:
a plurality of execution slices, wherein the multi-slice processor is configured to carry out:
capturing, by adaptive failure state information logic in a bank of observation latches, first state information corresponding to a first set of control signals;
monitoring, by the adaptive failure state information logic, state information of a plurality of logical components of the multi-slice processor;
selecting, by the adaptive failure state information logic in dependence upon one or more selection criteria and upon the monitored state information, a second set of control signals, wherein the selection criteria uses the monitored state information to identify a pattern of activity and state information to serve as a basis for selecting one or more particular state information latches to provide state information to one of more observation latches; and
capturing second state information, by the adaptive failure state information logic in the bank of observation latches, corresponding to the second set of control signals, wherein the first set of control signals is different than the second set of control signals.

9. The multi-slice processor of claim 8, wherein monitoring the plurality of logical components comprises determining a potential error condition based on the monitored state information for a current stage of processing of a logical component of the logical components.

10. The multi-slice processor of claim 9, wherein the logical component is an instruction sequencing unit, and wherein the state information indicates a program counter value corresponding to a potential hang state.

11. The multi-slice processor of claim 9, wherein the logical component is a history buffer, and wherein the state information indicates multiple attempts at a restore of an instruction.

12. The multi-slice processor of claim 8, wherein the first set of control signals correspond to a first set of state information latches receiving state information from one or more logical components, wherein the second set of control signals correspond to a second set of state information latches receiving state information from one or more logical components, and wherein the first set of state information latches is different than the second set of state information latches.

13. The multi-slice processor of claim 12, wherein the one or more selection criteria includes priority information corresponding to different types of control signals.

14. The multi-slice processor of claim 13, wherein the multi-slice processor is further configured to carry out:
accessing updated selection criteria specifying updated priority information; and
selecting, in dependence upon the updated selection criteria, a third set of control signals, wherein the third set of control signals is different than the second set of control signals.

15. An apparatus comprising:
a plurality of execution slices, wherein the multi-slice processor is configured to carry out:
capturing, by adaptive failure state information logic in a bank of observation latches, first state information corresponding to a first set of control signals;
monitoring, by the adaptive failure state information logic, state information of a plurality of logical components of the multi-slice processor;
selecting, by the adaptive failure state information logic in dependence upon one or more selection criteria and upon the monitored state information, a second set of control signals, wherein the selection criteria uses the monitored state information to identify a pattern of activity and state information to serve as a basis for selecting one or more particular state information latches to provide state information to one of more observation latches; and
capturing second state information, by the adaptive failure state information logic in the bank of observation latches, corresponding to the second set of control signals, wherein the first set of control signals is different than the second set of control signals.

16. The apparatus of claim 15, wherein monitoring the plurality of logical components comprises determining a potential error condition based on the monitored state information for a current stage of processing of a logical component of the logical components.

17. The apparatus of claim 16, wherein the logical component is an instruction sequencing unit, and wherein the state information indicates a program counter value corresponding to a potential hang state.

18. The apparatus of claim 16, wherein the logical component is a history buffer, and wherein the state information indicates multiple attempts at a restore of an instruction.

19. The apparatus of claim 15, wherein the first set of control signals correspond to a first set of state information latches receiving state information from one or more logical components, wherein the second set of control signals correspond to a second set of state information latches receiving state information from one or more logical components, and wherein the first set of state information latches is different than the second set of state information latches.

* * * * *